United States Patent [19]

Ginggen

[11] 4,353,168

[45] Oct. 12, 1982

[54] INSTRUMENT FOR MEASURING LINEAR MAGNITUDES

[75] Inventor: Serge Ginggen, Chavannes, Switzerland

[73] Assignee: Tesa S.A., Renens, Switzerland

[21] Appl. No.: 240,866

[22] Filed: Mar. 5, 1981

[30] Foreign Application Priority Data

Mar. 11, 1980 [CH] Switzerland ............... 1884/80

[51] Int. Cl.³ .............................................. G01B 7/02
[52] U.S. Cl. ............................. 33/147 H; 33/147 J;
  33/143 R; 33/148 F
[58] Field of Search ............ 33/143 R, 147 R, 147 G,
  33/147 H, 147 K, 148 F

[56] References Cited

U.S. PATENT DOCUMENTS

| | | | |
|---|---|---|---|
| 2,849,797 | 9/1958 | Etchell | 33/147 K |
| 2,873,533 | 2/1959 | Wilson | 33/147 K |
| 3,827,153 | 8/1974 | Mitchell | 33/147 K |
| 4,208,796 | 6/1980 | Michaud et al. | 33/147 K |

FOREIGN PATENT DOCUMENTS

957792  1/1957  Fed. Rep. of Germany ... 33/147 K

*Primary Examiner*—Steven L. Stephan
*Attorney, Agent, or Firm*—Hedman, Casella, Gibson & Costigan

[57] ABSTRACT

An instrument composed of a measurement head (1) and a fixed stop (2) which are connected by a body (3) formed of interchangeable extension pieces (4, 5), the instrument being intended to check the dimensions of bulky parts.

The two contact stops (12) of this instrument are offset at the end of two parallel measurement feelers (10, 11).

With each of these two contact members there is associated an instrument for measuring their inclination, which consists of an electronic clinometer (25, 26).

The two clinometers are connected to an apparatus (30) for reading the inclination of the two measurement feelers.

The inclination of one of the two measurement feelers (11) is adjustable by means of an operating screw (17).

In this way it is possible to reestablish parallelism of the measurement feelers when the instrument bends, upon measurements of large dimensions.

7 Claims, 5 Drawing Figures

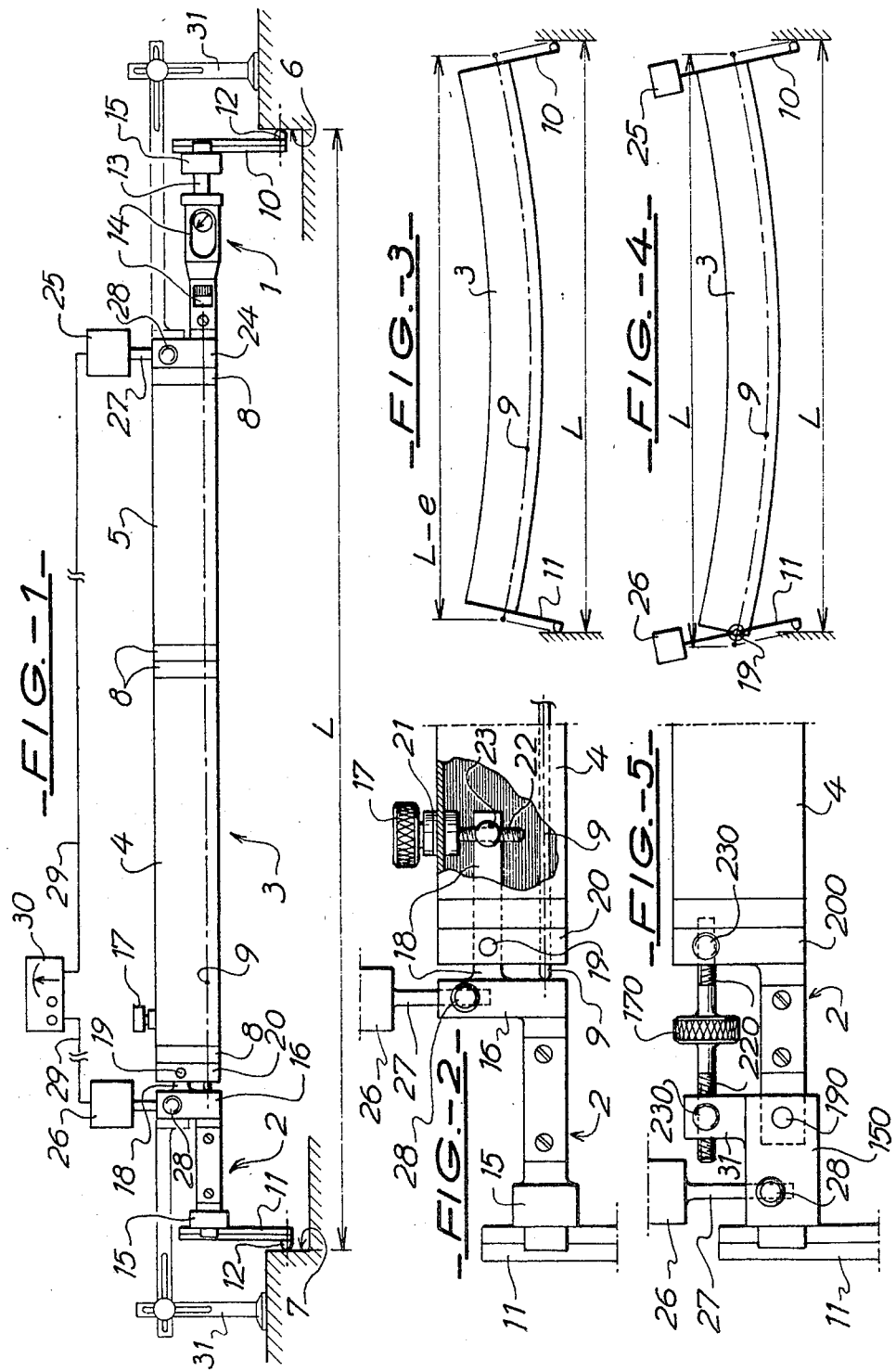

INSTRUMENT FOR MEASURING LINEAR MAGNITUDES

The object of the present invention is an instrument for measuring linear magnitudes which is intended for the verification of the dimensions of bulky parts such as, for instance, impellers and frames of turbines of hydraulic and thermal power plants.

Measurement instruments which are designated for this purpose comprise a measurement head and a fixed stop which are connected together by a body formed of interchangeable extension pieces with aligned incorporated gauge rods, and two measurement feelers, one borne by the measurement head and the other by the fixed stop, which feelers are formed of two parallel arms on each of which a contact stop is fastened in a position offset with respect to the alignment of the gauge rods.

These instruments make it possible to carry out measurements of as much as several meters.

In order to assure their reliability the thermal expansion caused by their handling and the propensity for flexure due to their great length have been taken into account in their design.

Thus the gauge rods to which the measurements are referred and which connect the measurement head to the fixed stop without interruption in contact are arranged within extension pieces, the latter being of tubular structure so as to insulate these rods from the hands of the user. These tubular extension pieces are furthermore of sufficiently rigid structure that the flexure of the body of the instrument which they form does not result in appreciable differences, with due regard to the permissible tolerances, between the length of the arc which they form and the length of the theoretical measurement chord when the contact stops of the measurement feelers of these instruments are in the alignment of the gauge rods.

On the other hand, when these contact stops are offset on the measurement feelers with respect to the alignment of the gauge rods, as in the type of instrument to which the present invention refers, it is no longer possible, within the limits of what is reasonable, to obtain sufficient rigidity of the extension pieces to prevent errors, since the measurement error due to the flexure of the body is excessively amplified by this offset of the contact stops.

In this case, upon measurements effected in horizontal position, a special device is provided which is composed of support rollers which are placed below the body of the instrument in order to support it at precise points known as Airy points, in order to minimize the effects of its deformation by flexure.

However, the putting in place of these rollers presupposes the existence of support surfaces at the desired places and levels on the part to be measured, which is rarely the case. Most frequently, it is necessary to create them artificially by subsidiary means, and this results in a loss of time, requires a certain amount of skill, and may even cause problems which are difficult to solve in simple fashion, such as, for instance, upon verification of a borehole of large diameter in a horizontal frame wall.

The purpose of the present invention is to avoid the necessity of confronting these problems.

According to the invention there is provided a means for checking the inclination of the two measurement feelers in the plane containing said feelers forming parallel arms, and a means for adjusting the inclination of at least one of the two measurement feelers in the said plane. This solution achieves the aforesaid purpose since it makes it possible to avoid the necessity of eliminating the flexure of the body of the instrument, which is the cause of the aforementioned error and problems, by correcting its effects.

Due to the device for checking the inclination of the two measurement feelers of the instrument and the device for adjusting the inclination of at least one of them, it is in fact possible to correct the relative angular deviation of the measurement feelers on which the contact stops are offset, which is caused by the flexure of the instrument and results in amplification of the error, as is described in detail in the following description.

The accompanying drawing shows, by way of example, one embodiment of the object of the invention as well as a variant.

FIG. 1 is an overall view in elevation of the embodiment.

FIG. 2 is an enlarged view in elevation of a detail of FIG. 1.

FIGS. 3 and 4 are explanatory diagrams.

FIG. 5 is a view in elevation of a detail of the variant.

The measuring instrument shown in FIGS. 1 and 2 is composed of a measurement head 1 and of a fixed stop 2 which are connected by a body 3 formed of extension pieces 4 and 5 selected from a set of extension pieces forming part of its equipment as a function of the magnitude to be measured, which is represented here by the distance L between two walls 6 and 7.

These extension pieces consist of tubular metal shapes, in this case of elliptical section, each having connecting elements 8 and within which there are enclosed, in customary manner, aligned gauge rods 9 which continuously rest elastically against each other, connecting the measurement head 1 to the fixed stop 2.

This instrument has two measurement feelers 10 and 11 formed of two parallel arms on each of which there is fastened a contact stop 12, in this case with point contact, in a position offset with respect to the alignment of the gauge rods 9.

The measurement head 1 is of the customary type, within the body of which a movable axial feeler rod 13 to which the measurement feeler 10 is fastened acts on the movable indicating members of reading dials 14.

The two measurement feelers 10 and 11 are rigidly connected to the measurement head 1 and the fixed stop 2 in customary manner via supports 15 in which they can be adjusted to the desired height as a function of the type of measurement to be effected.

The fixed stop 2 is connected to the body 3 of the instrument by a device for adjusting the inclination of the measurement feeler 11 in the plane defined by the two measurement feelers. This device is composed of a rocker 16 and an operating screw 17. The rocker 16 has an arm 18 which is articulated on a pivot 19 arranged perpendicular to the plane of the contact members and borne by an element 20 which connects to the extension piece 4. The stop 2 is fastened rigidly on this rocker 16. The operating screw 17 is held in an axial immobilization bracket 21 fastened to the wall of the extension piece 4 and its threaded rod 22 is in engagement in a radial threaded hole of a shaft 23 which is mounted for turning at the end of the arm 18.

The measurement head 1 is fastened rigidly to the extension piece 5 of the body 3 via a connecting element 24.

With the two measurement feelers 10 and 11 there is associated a device for checking their inclination in the plane which they define, this device consisting here of two clinometers 25 and 26 each arranged in position fixed in space with respect to the contact member with which it is associated. Each of these two clinometers has an attachment rod 27 engaged in a blind hole in a member of the measuring instrument and locked in this hole by means of a clamping screw 28.

The clinometer 25 is fastened in this way to the connecting element 24 of the measuring head 1 and the clinometer 26 to the rocker 16 on which the stop 2 is fastened.

These two clinometers are here electronic levels of the customary type which give off an analog electric signal of their inclination with respect to the vertical reference established by an incorporated pendulum weight when the instrument is used in a vertical plane, as shown in FIG. 1. These two electronic levels are connected by two cables 29 to an apparatus 30 for the reading of the inclination values detected, which correspond, after adjustment of their zeros, as a result of the mounting described, to the inclinations of the two measurement feelers 10 and 11. This reading apparatus may be installed either on the instrument or at the place deemed most favorable by the operator.

The measurement instrument constituted in this manner is shown in FIG. 1 held supported upon the part to be measured by two adjustable supports 31, shown in thin line in order not to unnecessarily clutter the drawing, one of them being attached to the rocker 16 and the other to the element 24 connecting the measurement head 1 with the body 3. However this equipment is not indispensable and the instrument can be held in place manually by two operators or by any other means, at the convenience of the users.

The measurement effected by means of the instrument described is carried out in a relatively simple manner.

The measurement head 1 and the electronic levels 25 and 26 having been previously calibrated, the instrument is put in place on the part to be measured, for instance, as shown in FIG. 1, with the contact stops of its two measurement feelers 10 and 11 resting against the walls 6 and 7 delimiting the geometrical conformation to be measured.

At this moment the operator compares the inclination values of the two measurement feelers 10 and 11 by reading the values posted on the reading apparatus 30.

Depending on the amount of bend of the instrument, a greater or lesser difference appears between the inclination of the measurement feeler 11 of the fixed stop and the inclination of the measurement feeler 10 of the measurement head.

Due to the offset of the contact stops of the measurement feelers with respect to the alignment of the slip gauges 9, this phenomenon, shown diagrammatically in intentionally exaggerated manner in FIG. 3, creates an error in the measurement which is indicated by a difference e between the actual dimension L of the conformation measured and the value displayed by the measurement head 1.

This difference e is not measurable. In order to do away with it, the operator modifies the inclination of the measurement feeler 11 by adjusting the operating screw 17, which has the effect of causing the stationary stop 2 to pivot around the pivot 19 until the value of this inclination corresponds to that of the other measurement feeler 10. At that moment, the original parallelism of the two contact members is reestablished and the value displayed by the measurement head corresponds to the dimension L, as shown in the diagram of FIG. 4.

Of course, the use of the instrument is not limited to horizontal measurements. It also may be used with the same advantages in planes of greater or lesser inclination, within the limits, however, of the capacity of the clinometers employed.

Modifications may be made, one of which is shown partially in FIG. 5. In this variant, the measurement feelers 11 of the fixed stop 2 is articulated on the latter, via its support 150, on a pivot 190. Its inclination is adjustable by means of a screw 170 having two oppositely threaded rods 220 with reverse pitch in engagement, on each side, in two shafts 230, one mounted for rotation in an arm 31 which is integral with the support 150 and the other in an element 200 which connects the fixed stop 2 to the extension piece 4 of the body of the instrument. The clinometer 26 is fixed here on the measurement feeler support 150. This variant makes it possible to avoid the special appropriation of one end of the extension pieces which can be connected to the stop 2.

The clinometers 25 and 26 may be selected of another type, such as for instance bubble or optical clinometers.

It is also possible to make use, for the verification of the inclination of the measurement feelers, of precision pin-and-arc indicators when the part to be measured has aligned reference planes on either side of the instrument, or even comparators if the instrument is provided with at least one reference plane.

Within the scope of the invention it is also possible to articulate the measurement head 1 on the body 3, in the same manner as the fixed stop 2, or else to articulate the measurement feeler 10 on the said measurement head, in the same manner as in FIG. 5 of the variant shown. The variant in which inclination of the two measurement feelers is provided is advantageous in the event that the contact stops 12 are in linear rather than in point contact, since one can then easily assure the linear contact of the edge of the contact stop of the two measurement feelers with the walls of the part to be measured.

The connecting of the clinometers 25 and 26 to a reading apparatus 30 is not indispensable when the clinometers used themselves have an indicating dial. However, this variant is less practical when the dimension to be measured is large, since the operator must move upon each adjustment or else obtain the aid of an assistant.

Finally, the clinometers may be fastened permanently on the apparatus. However, when they are removable, as in the structures shown, their calibration can be effected easily elsewhere than on the instrument, for instance on a suitable rigid frame of small size which is not subject to flexure.

What is claimed is:

1. An instrument for measuring large linear magnitudes comprising:
   (a) a measurement head;
   (b) a fixed stop;
   (c) a body connecting said measurement head and fixed stop, said body formed of interchangeable extension pieces;

(d) gauge rods aligned and incorporated within said extension pieces, said gauge rods resiliently biased against each other;

(e) a measurement feeler borne by said measurement head, and a measurement feeler borne by said fixed stop, each of said measurement feelers being formed by an arm and said arms being parallel to each other, whereby said arms are contained in a plane;

(f) a contact stop fastened on each of said arms in a position offset with respect to the alignment of said gauge rods;

(g) means for checking the inclination of the two measurement feelers in the plane containing said feelers forming parallel arms; and (h) means for adjusting the inclination of at least one of said measurement feelers in said plane.

2. An instrument according to claim 1, wherein said checking means comprise two clinometers associated with the two measurement feelers, each of said clinometers being arranged in fixed spaced relationship with the measurement feeler with which it is associated.

3. An instrument according to claim 2, wherein the two clinometers are removably associated with the two measurement feelers.

4. An instrument according to claim 2, wherein the two clinometers are electronic levels.

5. An instrument according to claim 4, wherein said two electronic levels are connected by a cable to an apparatus for reading the amounts of inclination of both the measurement feelers to which they are associated.

6. An instrument according to claim 1, in which one of said measurement feelers is rigidly fastened to the measurement head while the other is rigidly fastened to the fixed stop, in which at least one of said measurement head or fixed stop is articulated on a pivot which is borne by the said body perpendicularly to the said plane containing the feeler forming parallel arms, and further comprising at least a means for adjusting the pivoting of said measurement head or fixed stop around said pivot.

7. An instrument according to claim 1, in which at least one of the two measurement feelers is articulated on a pivot which is perpendicular to the said plane containing the feeler forming parallel arms; in which said pivot is borne by either the measurement head or fixed stop with which the said measurement feeler is associated; in which the axis of said pivot is secant to the axis of said gauge rods; and further comprising at least a means for adjusting the pivoting of said measurement feeler around said pivot.

* * * * *